(12) United States Patent
Bristow

(10) Patent No.: US 11,160,273 B2
(45) Date of Patent: *Nov. 2, 2021

(54) AQUEOUS SUSPOEMULSION AND A PROCESS FOR PREPARING THE SAME

(71) Applicant: ROTAM AGROCHEM INTERNATIONAL COMPANY LIMITED, Hong Kong (CN)

(72) Inventor: James Timothy Bristow, Hong Kong (CN)

(73) Assignee: ROTAM AGROCHEM INTERNATIONAL COMPANY LIMITED, Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/913,244

(22) PCT Filed: Jun. 19, 2014

(86) PCT No.: PCT/CN2014/080266
§ 371 (c)(1),
(2) Date: Feb. 19, 2016

(87) PCT Pub. No.: WO2015/024410
PCT Pub. Date: Feb. 26, 2015

(65) Prior Publication Data
US 2016/0198703 A1 Jul. 14, 2016

(30) Foreign Application Priority Data
Aug. 22, 2013 (BR) ...................... 102013021474422

(51) Int. Cl.
*A01N 25/04* (2006.01)
*A01N 51/00* (2006.01)
(52) U.S. Cl.
CPC ............. *A01N 25/04* (2013.01); *A01N 51/00* (2013.01)
(58) Field of Classification Search
CPC ............................... A01N 25/04; A01N 53/00
See application file for complete search history.

(56) References Cited

U.S. PATENT DOCUMENTS

| 6,559,156 | B1 * | 5/2003 | Dimitrova | A01N 43/54 514/275 |
| 7,015,177 | B2 * | 3/2006 | Knott | A01N 25/10 424/501 |
| 2006/0014724 | A1 | 1/2006 | Jadhav et al. | |
| 2009/0247597 | A1 * | 10/2009 | Vermeer | A01N 25/30 514/383 |
| 2009/0305889 | A1 * | 12/2009 | Cush | A01N 25/04 504/101 |
| 2013/0071460 | A1 | 3/2013 | Shah | |

FOREIGN PATENT DOCUMENTS

| CN | 1933732 | A | | 3/2007 | | |
| CN | 101984807 | A | | 3/2011 | | |
| CN | 102986721 | A | | 3/2013 | | |
| DK | 2422619 | A1 | * | 2/2012 | ............. | A01N 51/00 |
| EP | 2422619 | A1 | * | 2/2012 | ............. | A01N 51/00 |
| EP | 2422619 | A1 | * | 2/2012 | ............. | A01N 51/00 |
| RU | 2395201 | 01 | * | 7/2010 | | |
| RU | 2395201 | C1 | * | 7/2010 | | |
| RU | 2395201 | C1 | * | 7/2010 | | |
| WO | WO-9402020 | A1 | * | 2/1994 | ............. | A01N 53/00 |
| WO | 2013091154 | A1 | | 6/2013 | | |

OTHER PUBLICATIONS

Zhang, Y., et al., Preparation of lambda-cyhalothrin oil in water emulsion with esterified starch and methyl oleate as emulsifier and solvent. Yingyong Huaxue vol. 29 published 2012. English Abstract provided.*
Zhang et al., ((YingYong Huaxue vol. 29 published 2012 (abstract provided)).*
Zhang et al., (YingYong Huexue vol. 29 pp. 106-112. Abstract Provided. Published 2012) (Year: 2012).*
Zhang et al., (Acta Phytophylacica Sinica vol. 38 pp. 357-362. Published 2011) (Year: 2011).*
Lambda-Cyhalothrin Human Health and Ecological Risk Assessment .Published 2010 (Year: 2010).*
Emulsifiable Concentrate. Ajinmoto .Published 2020 (Year: 2020).*
Emulsion. Oxford Dictionary. Published 2020 (Year: 2020).*
Solvesso 200 product page. Brenntag (Year: 2020).*
International Search Report of PCT/CN2014/080266 dated Sep. 29, 2014.
Written Opinion dated Sep. 17, 2014.
Chinese First Office Action with English Translation Summary.

* cited by examiner

*Primary Examiner* — Theodore R. Howell
*Assistant Examiner* — George W Kosturko
(74) *Attorney, Agent, or Firm* — Dickinson Wright PLLC

(57) ABSTRACT

An aqueous suspoemulsion (SE) comprising:
a dispersed oil phase of Component (a), comprising:
  (i) lambda-cyhalothrin as the first active ingredient;
  (ii) at least one solvent having lambda-cyhalothrin dissolved therein;
a continuous water phase of Component (b), comprising:
  (i) imidacloprid as the second active ingredient; and
  (ii) water having imidacloprid suspended therein; and
optionally at least one additive is provided.
A process for preparing an aqueous suspoemulsion comprising:
  Step 1: Preparing lambda-cyhalothrin EC phase by mixing the active ingredient with a suitable solvent;
  Step 2: Preparing a dispersion of imidacloprid in a continuous water phase by mixing the active ingredient, a dispersant and a required amount of water; and
  Step 3: Combining the EC phase in Step 1 with the water phase in Step 2.

30 Claims, No Drawings

US 11,160,273 B2

AQUEOUS SUSPOEMULSION AND A PROCESS FOR PREPARING THE SAME

This application is a 371 national phase entry of PCT/CN2014/080266, filed 19 Jun. 2014, which claims benefit of Brazil Patent Application No. 10 2013 021474422, filed 22 Aug. 2013, the entire contents of which are incorporated herein by reference for all purposes.

FIELD

The present invention provides a novel aqueous suspoemulsion (SE) comprising imidacloprid as suspended solid component and lambda-cyhalothrin as emulsified component.

BACKGROUND

Imidacloprid, with IUPAC name as (E)-1-(6-chloro-3-pyridylmethyl)-N-nitroimidazolidin-2-ylideneamine, can control sucking insects, including rice-, leaf- and planthoppers, aphids, thrips and whiteflies. It is also effective against soil insects, termites and some species of biting insects, such as rice water weevil and Colorado beetle. Imidacloprid can be used as a seed dressing, soil treatment and foliar treatment in different crops, e.g. rice, cotton, cereals, maize, sugar beet, potatoes, vegetables, citrus fruit, pome fruit and stone fruit. Imidacloprid is generally commercialized in emulsifiable concentrate (EC), suspension concentrate (SC), soluble concentrate (SL), and wettable powder (WP).

Lambda-cyhalothrin is the ISO approved common name of the insecticidally active ingredient consisting of enantiomers (S)-α-cyano-3-phenoxybenzyl (Z)-(1R,3R)-3-(2-chloro-3,3,3-trifluoroprop-1-enyl)-2,2-dimethylcyclopropanecarboxylate and (R)-α-cyano-3-phenoxybenzyl (Z)-(1S,3S)-3-(2-chloro-3,3,3-trifluoroprop-1-enyl)-2,2-dimethylcyclopropanecarboxylate in racemic proportion. The insecticidal product lambda-cyhalothrin has previously been formulated into emulsifiable concentrate. Products comprising lambda-cyhalothrin intended for use in agriculture or horticulture are usually sold under the trade mark KARATE®.

In recent years there has been a desire to increase the efficacy, broaden the spectrum, and delay resistance to insecticides by combining application of two or more products.

U.S. Pat. No. 7,531,187 provides a synergistic insecticidal composition comprising a chloronicotynyle compound, preferably imidacloprid, and a pyrethroids compound, preferably cypermethrin. The synergistic insecticidal composition can be converted into customary formulations, such as solutions, emulsions, suspensions, powders, foams, pastes, granules, aerosols, active-compound-impregnated natural and synthetic materials, very fine encapsulations in polymeric substances and in coating compositions for seed. The preferred formulations are emulsifiable concentrate, wettable powder and dry flowable granular (DF). The examples illustrate imidacloprid+cypermethrin WP, imidacloprid+permethrin WP, imidacloprid+cypermethrin DF, imidacloprid+permethrin DF, imidacloprid+cypermethrin EC and imidacloprid+permethrin EC. In this synergistic insecticidal composition, the chlornicotynyle compound is provided in an amount preferably ranging from 0.1 to 5.0% by weight of the synergistic insecticidal composition. The pyrethroids compound is provided in an amount preferably ranging from 1 to 60% by weight of the synergistic insecticidal composition.

Generally, for single imidacloprid, it can be formulated into emulsifiable concentrate or soluble concentrate. According to the inventor's experience, when imidacloprid content in the premix is greater than 20%, it is difficult to select a solvent to solubilize imidacloprid. On the other hand emulsifiable concentrate requires substantial quantities of organic solvents such as aromatic hydrocarbons, chlorinated hydrocarbons, for effective formulation of the active ingredients. Such organic solvents create toxicological and eco-toxicological problems. For these reasons, ICAMA (the Institute for the Control of Agrochemicals, Ministry of Agriculture) of China has canceled registration of emulsifiable concentrate products. Some European countries and Brazil have increased the criterion of registration of emulsifiable concentrate products. Therefore, suspending imidacloprid as an aqueous suspension, instead of dissolving it in a strongly polar solvent, has become a popular trend. An example of commercial suspension product is imidacloprid 600FS (GAUCHO® from Bayer). Content of imidacloprid in a suspension can be increased up to 60%, which is not feasible in an emulsifiable concentrate.

Similarly, traditional lambda-cyhalothrin formulation is also emulsifiable concentrate. Some environmental-friendly formulations have been developed. CN101828571 describes a suspension concentrate of lambda-cyhalothrin. CN101167471 describes lambda-cyhalothrin in water-dispersible granular formulation. CN1600099 describes a wettable powder containing lambda-cyhalothrin. In these formulations, lambda-cyhalothrin tends to separate out during fine grinding and milling due to its low melting point. Such obtained compositions generally do not exhibit good dispersibility and shelf life, since the low melting active ingredient undergoes a phase change at ambient storage temperature (−5° C. to 50° C.) leading to caking and crystal growth. Therefore, wettable powder, suspension concentrate and water-dispersible granule formulations are not suitable for the premix of imidacloprid and lambda-cyhalothrin.

CN1836513, WO2005096820, WO2002028186, CN1274530 and WO9522902 disclose compositions comprising solid active ingredients, such as fipronil and imidacloprid, and liquid active ingredients, such as lambda-cyhalothrin and chlorpyrifos, formulated as an oil emulsion, ultra-low content spray, oil-in-water emulsion (EW), microemulsion, wettable powder, water-dispersible granule, dry suspension, granule, aqueous solution, aerosol, suspension concentrate and emulsifiable concentrate. While these prior arts generally disclose various formulations of a combination of pesticidal active ingredients, they do not provide or teach a method of preparing water-dispersible granule, suspension concentrate and wettable powder composition. Commercial products based on the above combinations are not readily available.

Microencapsulation formulation (CS) can solve the problem of low melting point of lambda-cyhalothrin, and the premix of imidacloprid and lambda-cyhalothrin can be formulated into ZC, a mixed formulation of lambda-cyhalothrin CS and imidacloprid SC. However, production process of this formulation is complex and expensive. Commercial product is not readily available.

It would be very desirable to provide a composition comprising imidacloprid and lambda-cyhalothrin that is friendly to the environment. It would be also advantageous to provide such a composition that contains more than 20% imidacloprid in the composition, so as to provide a higher efficacy. It would be also important to provide such a composition which is stable under ambient storage condition (−5° C. to 50° C.) and after dilution.

SUMMARY OF THE INVENTION

The present invention provides a novel aqueous suspoemulsion comprising imidacloprid as suspended solid component and lambda-cyhalothrin as emulsified component.

The present invention also provides an aqueous suspoemulsion composition which is friendly to the environment.

The present invention also provides a novel aqueous suspoemulsion which comprises more than 20% imidacloprid in the composition to provide a higher efficacy.

The present invention also provides a novel aqueous suspoemulsion which exhibits both a high degree of physical and chemical stability and flowability, in particular, in a temperature ranging from −5° C. to 54° C., in which no crystallization phenomena and caking are observed after storage.

The present invention also provides a novel aqueous suspoemulsion which exhibits both dispersibility and suspensibility before and after storage in a temperature ranging from −5° C. to 54° C., in which no crystallization phenomena are observed after storage.

Accordingly, in a first aspect, the present invention provides an aqueous suspoemulsion comprising:
a dispersed oil phase, Component (a), comprising:
  (i) lambda-cyhalothrin as the first active ingredient;
  (ii) at least one solvent having lambda-cyhalothrin dissolved therein;
a continuous water phase, Component (b), comprising:
  (i) imidacloprid as the second active ingredient; and
  (ii) water having imidacloprid suspended therein; and
optionally at least one additive selected from the group consisting of an anti-foaming agent, an emulsifier, an anti-freeze agent, a dispersant, a preservative, an antioxidant, a colorant, a thickener and an inert filler.

The oil phase, Component (a), may contain other additives.

The continuous water phase, Component (b), may further comprise one or more dispersants and other additives.

In a further aspect, the present invention provides a process for preparing an aqueous suspoemulsion as hereinbefore described, characterized in that it comprises:
  Step 1: Preparing lambda-cyhalothrin EC phase by mixing the active ingredient with a suitable solvent;
  Step 2: Preparing a dispersion of imidacloprid in a continuous water phase by mixing the active ingredient, a dispersant and a required amount of water; and
  Step 3: Combining the EC phase in Step 1 with the water phase in Step 2.

Alternatively, the present invention provides a process for preparing an aqueous suspoemulsion comprising:
  Step 1: Preparing lambda-cyhalothrin EC phase by mixing the active ingredient with a suitable solvent;
  Step 2: Adding lambda-cyhalothrin EC phase in Step 1 into water with high shear to give lambda-cyhalothrin EW phase;
  Step 3: Preparing a dispersion of imidacloprid in a continuous water phase by mixing the active ingredient, a dispersant and a required amount of water; and
  Step 4: Combining the EW phase in Step 2 with the water phase in Step 3.

Use of the suspoemulsion described above and a method of treating pests at a locus comprising applying the suspoemulsion are also provided by the present invention.

DETAILED DESCRIPTION

An aqueous suspoemulsion (SE) is a combination of an emulsifiable concentrate (EC) of one component and a suspension concentrate (SC) of another component. An EC phase is one in which the active ingredient is dissolved in oil. A SC is a suspension of another active ingredient in water. When the two are mixed, water used as the continuous phase in the emulsion, carrying oil droplets used as the dispersed phase containing one active ingredient, is intermingled with suspended particles of another active ingredient. Generally, the SC, and hence the resulting SE, additionally contains other components such as a dispersant to aid the stability of the suspension and hence of the whole system.

In a first aspect, the present invention provides an aqueous suspoemulsion comprising:
a dispersed oil phase, Component (a), comprising:
  (i) lambda-cyhalothrin as the first active ingredient;
  (ii) at least one solvent having lambda-cyhalothrin dissolved therein;
a continuous water phase, Component (b), comprising:
  (i) imidacloprid as the second active ingredient; and
  (ii) water having imidacloprid suspended therein; and
optionally at least one additive selected from the group consisting of an anti-foaming agent, an emulsifier, an anti-freeze agent, a dispersant, a preservative, an antioxidant, a colorant, a thickener and an inert filler.

In a further aspect, the present invention provides a process for preparing an aqueous suspoemulsion as hereinbefore described, characterized in that it comprises:
  Step 1: Preparing lambda-cyhalothrin EC phase by mixing the active ingredient with a suitable solvent;
  Step 2: Preparing a dispersion of imidacloprid in a continuous water phase by mixing the active ingredient, a dispersant and a required amount of water; and
  Step 3: Combining the EC phase in Step 1 with the water phase Step 2.

Alternatively, the present invention provides a process for preparing an aqueous suspoemulsion comprising:
  Step 1: Preparing lambda-cyhalothrin EC phase by mixing the active ingredient with a suitable solvent;
  Step 2: Adding lambda-cyhalothrin EC phase in Step 1 into water with high shear to give lambda-cyhalothrin EW phase;
  Step 3: Preparing a dispersion of imidacloprid in a continuous water phase by mixing the active ingredient, a dispersant and a required amount of water; and
  Step 4: Combining the EW phase in Step 2 with the water phase in Step 3.

The suspoemulsion of the present invention may be produced using techniques known to one skilled in the art.

The suspoemulsion of the present invention may comprise one or more solvents in Component (a). Suitable solvents are aromatic hydrocarbon, for example, SOLVESSO™ 200, AE700, EXXONMOBIL™ (from EXXON), N-methyl pyrrolidone, methyl oleate, propylene carbonate, N-octyl pyrrolidone, cyclohexyl-1-pyrrolidone, mixtures of paraffinic, isoparaffinic, cycloparaffinic hydrocarbons, and combinations thereof. Suitable solvents are commercially available.

The suspoemulsion of the present invention may comprise one or more emulsifiers in Component (a). Suitable emulsifiers for inclusion in the compositions of the present invention are also known in the art and commercially available. Suitable emulsifiers include both ionic and nonionic emulsifiers, such as fatty acid esters, fatty alcohol esters, ethers, alkyl sulphonates and aryl sulphonates. Other suitable surface active emulsifiers are also known to the person skilled in the art.

The suspoemulsion of the present invention may comprise one or more suitable dispersants in Component (b). The suspoemulsion according to the invention preferably comprises a mixture of two different dispersants. Preferred dispersants are the substances as mentioned below:

Methacrylic acid-methyl methacrylate-polyethylene glycol graft copolymer, for example, those commercially available under the name ATLOX™ 4913 (from Uniqema) and TERSPERSE® 2500 (from Huntsman Surfactant);

Tristyrylphenolethoxylates having an average of 16 to 60, preferably 16 to 50, ethylene oxide (EO) units; sulfated or phosphated tristylphenolethoxylates having an average of 6 to 20, preferably 7 to 16, EO units, and salts thereof; wherein specific mention may be made of commercial products known under the names SOPROPHOR® FLK, SOPROPHOR® 3 D33, and SOPROPHOR® S/40-P (from Rhodia); and Propylene oxide-ethylene oxide block copolymers having 10% to 50% EO, preferably with 20% to 50% EO, and more preferably with 30% to 40% EO, and preferably with a central polyoxypropylene portion having a molecular mass ranging from 1500 to 2000. Products commercially available under the names PLURONIC® PE 10100 (from BASF) and PLURONIC® PE 10500 (from BASF) may be mentioned by way of examples. The surfactants mentioned above are believed to impart the stability to the system.

In addition to the aforementioned components, the composition may comprise one or more further additives, as may be required. Additives for inclusion in the formulation are known in the art and commonly employed. Suitable additives which may be comprised in the suspoemulsion according to the invention are all customary formulation adjuvants, such as anti-foaming agents, emulsifiers, antifreeze agents, preservatives, antioxidants, colorants, thickeners and inert fillers.

Suitable anti-foaming agents include all substances which can normally be used for this purpose in agrochemical compositions. Particularly preferred anti-foaming agents are mixtures of polydimethylsiloxanes and perfluroalkylphosphonic acids, such as the silicone anti-foaming agents available from GE or Compton.

Suitable preservatives include all substances which can normally be used for this purpose in agrochemical compositions of this type. Suitable examples which may be mentioned include PREVENTOL® and PROXEL® (from Bayer AG).

Suitable antioxidants are all substances which can normally be used for this purpose in agrochemical compositions. Preference is given to butylated hydroxytoluene.

Suitable inert fillers include all substances which can normally be used for this purpose in agrochemical compositions and which do not act as thickeners. Preference is given to inorganic particles, such as carbonates, silicates and oxides, and also to organic substances, such as urea/formaldehyde condensates. By way of example, kaolin, rutile, silica, finely divided silica, silica gels, natural and synthetic silicates, and also talc may be mentioned.

Suitable thickeners include all substances which can normally be used for this purpose in agrochemical compositions. For example xanthan gum, PVOH, polysaccharides, cellulose, clay hydrated silicates, magnesium aluminum silicates, and combinations thereof. Again, such thickeners are known in the art and available commercially.

The content of the individual components in the suspoemulsion according to the invention can be varied within a relatively wide range. Thus, the concentrations of the components as may be present are typically as follows:

of the active ingredient from the group (i) of Component (a) is generally between 1% and 40% by weight, preferably between 5% and 20% by weight;

of the active ingredient from the group (i) of Component (b) is generally between 5% and 60% by weight, preferably between 10% and 40% by weight;

of the solvents from the group (ii) of Component (a) are generally between 1% and 40% by weight, preferably between 5% and 20% by weight;

of the water content from the group (ii) of Component (b) can be varied within a wide range, depending on the other components and is generally between 25% and 80% by weight; and of the dispersants optionally added to Component (b) are generally between 1% and 10% by weight, preferably between 1% and 5% by weight.

Lambda-cyhalothrin in Component (a) and imidacloprid Component (b) may be present in the composition in any amounts relative to each other. In particular, the weight ratio of lambda-cyhalothrin and imidacloprid in the composition is preferably in the range of from 60:1 to 1:60, 40:1 to 1:40, or 15:1 to 1:15, more preferably 10:1 to 1:10, 5:1 to 1:5, or 2:1 to 1:2.

The suspoemulsion according to the present invention may be prepared using any suitable method. The formulations are preferably prepared by the following procedure:

Step 1: Preparing lambda-cyhalothrin EC phase by mixing the active ingredient with a solvent, along with suitable emulsifiers;

Step 2: Preparing a dispersion of imidacloprid in a continuous water phase by mixing the active ingredient, a dispersant, a required amount of water, and optionally other additives, such as antifreeze agent and anti-foaming agent, in a horizontal agitating bead mill with the process parameters maintained at median particle size D50 not to exceed 5 microns and D90 not to exceed 6 microns;

Step 3: Adding the EC phase in Step 1 to the water phase in Step 2 under continuous agitation for an optimum amount of time;

Step 4: Preparing thickeners in advance to enable them to be hydrated and ready for addition in Step 5 as mentioned below; and Step 5: Adding suitable quantity of the thickener from Step 4 to the mixture in Step 3 and continuously agitating till the mixture becomes a homogeneous suspension.

The preferred formulations are also prepared by the following procedure:

Step 1: Preparing lambda-cyhalothrin EC phase by mixing the active ingredient with a solvent, along with suitable emulsifiers;

Step 2: Adding lambda-cyhalothrin EC phase in Step 1 into water with high shear to give lambda-cyhalothrin EW phase;

Step 3: Preparing a dispersion of imidacloprid in a continuous water phase by mixing the active ingredient, a dispersant, a required amount of water, and optionally other additives, such as antifreeze agent and anti-foaming agent, in a horizontal agitating bead mill with the process parameters maintained at median particle size D50 not to exceed 5 microns and D90 not to exceed 6 microns;

Step 4: Adding the EW phase in Step 2 into the water phase in Step 3 under continuous agitation for an optimum amount of time;

Step 5: Preparing thickeners in advance to enable them to be hydrated and ready for addition in Step 6 as mentioned below; and Step 6: Adding suitable quantity of the thickener from Step 5 to the mixture in Step 4 and continuously agitating till the mixture becomes a homogeneous suspension.

The suspension is tested for low-temperature storage stability at −5° C. for 7 days, elevated-temperature storage stability at 54° C. for 14 days, and the stability when diluted at 30° C. for 24 h.

The suspoemulsion according to the invention are formulations which, even after storage at elevated temperatures or in the cold, remain stable with no crystal growth is observed. By dilution with water, they can be converted into homogeneous spray fluids without blocking the nozzles as a result of crystallization of the active ingredients in the spray fluids. These spray fluids are suitable to be applied by customary methods, for example, spraying or pouring.

The application rate of the suspoemulsion according to the invention can be varied within a relatively wide range. Concentration depends on the amounts of the active ingredients in the composition and intended purpose, which can be determined by a skilled person in this field.

In a further aspect, the present invention provides a method for controlling pests at a locus, in particular insects, which comprises applying to the locus an effective amount of a formulation as hereinbefore described.

Still further, the invention also provides the use of a concentrated formulation as hereinbefore described in the control of pests at a locus.

The suspoemulsions of the present invention exhibit improved physical and chemical stability across a wide range of conditions, in particular across a temperature ranging from −5° C. to 54° C., where no crystallization phenomena is observed during storage. The formulations are also environmental friendly.

The advantage of the formulations of the present invention is that commercially viable concentrations of stable formulations of the pesticide may be used without any substantial or detrimental formation of crystals.

The formulations of the present invention exhibit a low degree of phytotoxicity compared to the commercial emulsifiable concentrates.

The suspoemulsion formulations of the present invention have further advantages of being non-flammable, low dermal toxicity and low skin irritancy.

Finally, the suspoemulsion formulations of the present invention can be considered ecotoxicologically safe, since they are prepared from safe and substantially inert ingredients. This results not only useful formulations, but also formulations which can meet stringent requirements of the EPA in the United States and the standards of European control of volatile organic compounds.

While the invention will now be described in connection with certain preferred embodiments in the following examples, it will be understood that it is not intended to limit the invention to these particular embodiments. On the contrary, it is intended to cover all alternatives, modifications and equivalents as may be included within the scope of the invention as defined by the appended claims. Thus, the following examples, which include preferred embodiments, will serve to illustrate the practice of this invention, it being understood that the particulars shown are by way of example and for purposes of illustrative discussion of preferred embodiments of the present invention only and are presented in the cause of providing what is believed to be the most useful and readily understood description of procedures as well as of the principles and conceptual aspects of the invention.

FORMULATION EXAMPLES

Example 1

A suspoemulsion formulation was prepared as follows:
a) Preparation of Lambda-Cyhalothrin Emulsifiable Concentrate Phase:

| Component | Composition (g) | Remark |
| --- | --- | --- |
| Lambda-cyhalothrin Tech (Jiangsu Youshi) | 5 (as pure) | Active ingredient |
| Methyl oleate (Clariant) | 5 | Solvent |
| EL360 (Clariant) | 3 | Emulsifier |

The active ingredient lambda-cyhalothrin (from Jiangsu Youshi Chemistry) was mixed with methyl oleate (from Clariant) at room temperature. It was allowed to stand for 30 minutes before addition of an emulsifier EL360 (from Clariant) and stirring until a homogeneous solution was achieved.
b) Preparation of Dispersed Imidacloprid in a Continuous Water Phase:

| Component | Composition (g) | Remark |
| --- | --- | --- |
| Imidacloprid Tech (Jiangsu Yangnong) | 5 (as pure) | Active ingredient |
| SOPROPHOR ® BSU (Rhodia) | 0.5 | Dispersant |
| SOPROPHOR ® FLK (Rhodia) | 1.5 | Dispersant |
| Propylene glycol (DOW) | 4 | Antifreeze agent |
| RHODOPOL ® 23/W (Rhodia) | 0.15 | Thickener |
| Silicon oil (Degussa) | 0.5 | Anti-foaming agent |
| Water | Balance to 100 | Carrier |

The active ingredient imidacloprid, along with dispersants SOPROPHOR® BSU and SOPROPHOR® FLK, other additives, such as antifreeze and anti-foaming agent, and required amount of water were initially mixed well and finely milled using a horizontal agitating bead mill with the process parameters maintained at median particle size D50 not to exceed 5 microns and D90 not to exceed 6 microns.
c) Preparation of Suspoemulsion:

The EC phase in a) was added to the water phase in b) under a continuous agitation for an optimum amount of time at room temperature. Then suitable quantity of thickener (RHODOPOL® 23/W) was added to the mixture and continuously agitated until the mixture was a homogeneous suspension at room temperature. The suspension was tested for low-temperature storage stability (−5° C.), elevated-temperature storage stability (54° C.) and the stability when diluted at 30° C.

Example 2

A suspoemulsion formulation was prepared as follows:
a) Preparation of Lambda-Cyhalothrin Oil-in-Water Emulsion Phase:

| Component | Composition (g) | Remark |
| --- | --- | --- |
| Lambda-cyhalothrin Tech | 8 (as pure) | Active ingredient |
| Propylene carbonate (Local) | 8 | Solvent |

-continued

| Component | Composition (g) | Remark |
|---|---|---|
| ATLOX ™ 4912 (Croda) | 2 | Emulsifier |
| TWEEN ® 80 (Croda) | 0.3 | Emulsifier |

The active ingredient lambda-cyhalothrin was mixed with propylene carbonate at room temperature. It was allowed to stand for 30 minutes before addition of the emulsifier ATLOX™ 4912 and Tween 80 (from Croda) and stirring until a homogeneous solution was achieved. The lambda-cyhalothrin EC phase was added into water with high shear to give lambda-cyhalothrin EW phase.
b) Preparation of Dispersed Imidacloprid in a Continuous Water Phase:

| Component | Composition (g) | Remark |
|---|---|---|
| Imidacloprid Tech | 10 (as pure) | Active ingredient |
| TERSPERSE ®2500 (Huntsman) | 0.4 | Dispersant |
| PLURONIC ® PE 10500 (BASF) | 1.2 | Dispersant |
| Propylene glycol | 4 | Antifreeze agent |
| RHODOPOL ® 23/W (Rhodia) | 0.15 | Thickener |
| Silicon oil (Degussa) | 0.5 | Anti-foaming agent |
| Water | Balance to 100 | Carrier |

The preparation of the suspension concentrate of imidacloprid was carried out using the same general method as set out in b) of Example 1.
c) Preparation of Suspoemulsion:

The oil-in-water emulsion phase in a) was added to water phase in b) under a continuous agitation for an optimum amount of time. Then suitable quantity of thickener were added to the above mixture and continuously agitated until the mixture was a homogeneous suspension. The suspension was tested for low-temperature storage stability (−5° C.), elevated-temperature storage stability (54° C.) and the stability when diluted at 30° C.

Example 3

A suspoemulsion formulation was prepared as follows:
a) Preparation of Lambda-Cyhalothrin Emulsifiable Concentrate Phase:

| Component | Composition (g) | Remark |
|---|---|---|
| Lambda-cyhalothrin Tech | 10 (as pure) | Active ingredient |
| ISOPAR ™ L (Exxon) | 10 | Solvent |
| ALKAMULS ® OR/36 (Rhodia) | 3 | Emulsifier |

The emulsifiable concentrate of lambda-cyhalothrin was prepared in the same general manner as set out in a) of Example 1.
b) Preparation of Dispersed Imidacloprid in a Continuous Water Phase:

| Component | Composition (g) | Remark |
|---|---|---|
| Imidacloprid Tech | 10 (as pure) | Active ingredient |
| SOPROPHOR ® 3 D33 (Rhodia) | 2.3 | Dispersant |
| PLURONIC ® 10100 (BASF) | 2.3 | Dispersant |
| Propylene glycol (DOW) | 4 | Antifreeze agent |
| RHODOPOL ® 23/W (Rhodia) | 0.15 | Thickener |
| Silicon oil | 0.5 | Anti-foaming agent |
| Water | Balance to 100 | Carrier |

The preparation of the suspension concentrate of imidacloprid was carried out using the same general method as set out in b) of Example 1.
c) Preparation of Suspoemulsion:

The suspoemulsion was prepared using the same general procedure set out in c) of Example 1. The suspension was tested for low-temperature storage stability (−5° C.), elevated-temperature storage stability (54° C.) and the stability when diluted at 30° C.

Example 4

A suspoemulsion formulation was prepared as follows:
a) Preparation of Lambda-Cyhalothrin Emulsifiable Concentrate Phase:

| Component | Composition (g) | Remark |
|---|---|---|
| Lambda-cyhalothrin Tech | 15 (as pure) | Active ingredient |
| ISOPAR ™ L (Exxon) | 15 | Solvent |
| ALKAMULS ® OR/36 (Rhodia) | 3 | Emulsifier |

The emulsifiable concentrate of lambda-cyhalothrin was prepared in the same general manner as set out in a) of Example 1.
b) Preparation of Dispersed Imidacloprid in a Continuous Water Phase:

| Component | Composition (g) | Remark |
|---|---|---|
| Imidacloprid Tech | 15 (as pure) | Active ingredient |
| TERSPERSE ® 2500 (Huntsman) | 2.5 | Dispersant |
| SOPROPHOR ® FLK (Rhodia) | 1 | Dispersant |
| Propylene glycol | 4 | Antifreeze agent |
| RHODOPOL ® 23/W (Rhoida) | 0.15 | Thickener |
| Silicon oil (Degussa) | 0.5 | Anti-foaming agent |
| Water | Balance to 100 | Carrier |

The preparation of the suspension concentrate of imidacloprid was carried out using the same general method as set out in b) of Example 1.
c) Preparation of Suspoemulsion:

The suspoemulsion was prepared using the same general procedure set out in c) of Example 1. The suspension was tested for low-temperature storage stability (−5° C.), elevated-temperature storage stability (54° C.) and the stability when diluted at 30° C.

Example 5

A suspoemulsion formulation was prepared as follows:
a) Preparation of Lambda-Cyhalothrin Oil-in-Water Emulsion Phase:

| Component | Composition (g) | Remark |
|---|---|---|
| Lambda-cyhalothrin Tech | 20 (as pure) | Active ingredient |
| ISOPAR ™ M (Exxon) | 20 | Solvent |
| ALKAMULS ® OR/36 (Rhodia) | 3 | Emulsifier |

The oil-in-water emulsion of lambda-cyhalothrin was prepared in the same general manner as set out in a) of Example 2.

b) Preparation of Dispersed Imidacloprid in a Continuous Water Phase:

| Component | Composition (g) | Remark |
|---|---|---|
| Imidacloprid Tech | 20 (as pure) | Active ingredient |
| ATLOX ™ 4913 (Croda) | 2.3 | Dispersant |
| PLURONIC ® PE 10500 (BASF) | 0.8 | Dispersant |
| Propylene glycol | 4 | Antifreeze agent |
| RHODOPOL ® 23/W (Rhodia) | 0.15 | Thickener |
| Silicon oil | 0.5 | Anti-foaming agent |
| water | Balance to 100 | Carrier |

The preparation of the suspension concentrate of imidacloprid was carried out using the same general method as set out in b) of Example 2.

c) Preparation of Suspoemulsion:

The suspoemulsion was prepared using the same general procedure set out in c) of Example 2. The suspension was tested for low-temperature storage stability (−5° C.), elevated-temperature storage stability (54° C.) and the stability when diluted at 30° C.

Example 6

A suspoemulsion formulation was prepared as follows:
a) Preparation of Lambda-Cyhalothrin Oil-in-Water Emulsion Phase:

| Component | Composition (g) | Remark |
|---|---|---|
| Lambda-cyhalothrin Tech | 7.5 (as pure) | Active ingredient |
| Methyl oleate (Clariant) | 5 | Solvent |
| ALKAMULS ® OR/36 | 2 | Emulsifier |

The oil-in-water emulsion of lambda-cyhalothrin was prepared in the same general manner as set out in a) of Example 2.

b) Preparation of Dispersed Imidacloprid in a Continuous Water Phase:

| Component | Composition (g) | Remark |
|---|---|---|
| Imidacloprid Tech | 30 (as pure) | Active ingredient |
| ATLOX ™ 4913 (Croda) | 2.3 | Dispersant |
| PLURONIC ® PE 10500 (BASF) | 0.8 | Dispersant |
| Propylene glycol | 5 | Antifreeze agent |
| RHODOPOL ® 23/W | 0.15 | Thickener |
| Silicon oil | 0.5 | Anti-foaming agent |
| water | Balance to 100 | Carrier |

The preparation of the suspension concentrate of imidacloprid was carried out using the same general method as set out in b) of Example 2.

c) Preparation of Suspoemulsion:

The suspoemulsion was prepared using the same general procedure set out in c) of Example 2. The suspension was tested for low-temperature storage stability (−5° C.), elevated-temperature storage stability (54° C.) and the stability when diluted at 30° C.

Example 7

A suspoemulsion formulation was prepared as follows:
a) Preparation of Lambda-Cyhalothrin Emulsifiable Concentrate Phase:

| Component | Composition (g) | Remark |
|---|---|---|
| Lambda-cyhalothrin Tech | 1 (as pure) | Active ingredient |
| Propylene carbonate (Local) | 1 | Solvent |
| ATLOX ™ 4912 (Croda) | 2 | Emulsifier |
| TWEEN ® 80 (Croda) | 0.3 | Emulsifier |

The emulsifiable concentrate of lambda-cyhalothrin was prepared in the same general manner as set out in a) of Example 1.

b) Preparation of Dispersed Imidacloprid in a Continuous Water Phase:

| Component | Composition (g) | Remark |
|---|---|---|
| Imidacloprid Tech | 60 (as pure) | Active ingredient |
| TERSPERSE ® 2500 (Huntsman) | 0.4 | Dispersant |
| PLURONIC ® PE 10500 (BASF) | 1.2 | Dispersant |
| Propylene glycol | 4 | Antifreeze agent |
| RHODOPOL ® 23/W (Rhodia) | 0.15 | Thickener |
| Silicon oil (Degussa) | 0.5 | Anti-foaming agent |
| Water | Balance to 100 | Carrier |

The preparation of the suspension concentrate of imidacloprid was carried out using the same general method as set out in b) of Example 1.

c) Preparation of Suspoemulsion:

The suspoemulsion was prepared using the same general procedure set out in c) of Example 1. The suspension was tested for low-temperature storage stability (−5° C.), elevated-temperature storage stability (54° C.) and the stability when diluted at 30° C.

Example 8

A suspoemulsion formulation was prepared as follows:
a) Preparation of Lambda-Cyhalothrin Oil-in-Water Emulsion Phase:

| Component | Composition (g) | Remark |
|---|---|---|
| Lambda-cyhalothrin Tech | 30 (as pure) | Active ingredient |
| Methyl oleate (Clariant) | 30 | Solvent |
| ALKAMULS ® OR/36 | 3 | Emulsifier |

The oil-in-water emulsion of lambda-cyhalothrin was prepared in the same general manner as set out in a) of Example 2.

b) Preparation of Dispersed Imidacloprid in a Continuous Water Phase:

| Component | Composition (g) | Remark |
|---|---|---|
| Imidacloprid Tech | 10 (as pure) | Active ingredient |
| SOPROPHOR ® 3 D33 (Rhodia) | 2.3 | Dispersant |
| PLURONIC ® PE 10100 (BASF) | 2.3 | Dispersant |
| Propylene glycol | 4 | Antifreeze agent |
| RHODOPOL ® 23/W | 0.15 | Thickener |
| Silicon oil (Degussa) | 0.5 | Anti-foaming agent |
| Water | Balance to 100 | Carrier |

-continued

| Component | Composition (g) | Remark |
|---|---|---|

The preparation of the suspension concentrate of imidacloprid was carried out using the same general method as set out in b) of Example 2.
c) Preparation of Suspoemulsion:
The suspoemulsion was prepared using the same general procedure set out in c) of Example 2. The suspension was tested for low-temperature storage stability (−5° C.), elevated-temperature storage stability (54° C.) and the stability when diluted at 30° C.

Example 9

A suspoemulsion formulation was prepared as follows:
a) Preparation of Lambda-Cyhalothrin Emulsifiable Concentrate Phase:

| Component | Composition (g) | Remark |
|---|---|---|
| Lambda-cyhalothrin Tech | 40 (as pure) | Active ingredient |
| Propylene carbonate (Local) | 40 | Solvent |
| ALKAMULS ® OR/36 | 3 | Emulsifier |

The emulsifiable concentrate of lambda-cyhalothrin was prepared in the same general manner as set out in a) of Example 1.
b) Preparation of Dispersed Imidacloprid in a Continuous Water Phase:

| Component | Composition (g) | Remark |
|---|---|---|
| Imidacloprid Tech | 1 (as pure) | Active ingredient |
| TERSPERSE ® 2500 (Huntsman) | 2.5 | Dispersant |
| SOPROPHOR ® FLK (Rhodia) | 1 | Dispersant |
| Propylene glycol | 4 | Antifreeze agent |
| RHODOPOL ® 23/W | 0.15 | Thickener |
| Silicon oil | 0.5 | Anti-foaming agent |
| Water | Balance to 100 | Carrier |

The preparation of the suspension concentrate of imidacloprid was carried out using the same general method as set out in b) of Example 1.
c) Preparation of Suspoemulsion:
The suspoemulsion was prepared using the same general procedure set out in c) of Example 1. The suspension was tested for low-temperature storage stability (−5° C.), elevated-temperature storage stability (54° C.) and the stability when diluted at 30° C.

Example 10

A suspoemulsion formulation was prepared as follows:
a) Preparation of Lambda-Cyhalothrin Oil-in-Water Emulsion Phase:

| Component | Composition (g) | Remark |
|---|---|---|
| Lambda-cyhalothrin Tech | 5 (as pure) | Active ingredient |
| Methyl oleate (Clariant) | 15 | Solvent |
| ALKAMULS ® OR/36 | 3 | Emulsifier |

The oil-in-water emulsion of lambda-cyhalothrin was prepared in the same general manner as set out in a) of Example 2.
b) Preparation of Dispersed Imidacloprid in a Continuous Water Phase:

| Component | Composition (g) | Remark |
|---|---|---|
| Imidacloprid Tech | 40 (as pure) | Active ingredient |
| ATLOX ™ 4913 (Croda) | 2.3 | Dispersant |
| PLURONIC ® PE 10500 (BASF) | 0.8 | Dispersant |
| Propylene glycol | 4 | Antifreeze agent |
| RHODOPOL ® 23/W | 0.15 | Thickener |
| Silicon oil (Degussa) | 0.5 | Anti-foaming agent |
| Water | Balance to 100 | Carrier |

The preparation of the suspension concentrate of imidacloprid was carried out using the same general method as set out in b) of Example 2.
c) Preparation of Suspoemulsion:
The suspoemulsion was prepared using the same general procedure set out in c) of Example 2. The suspension was tested for low-temperature storage stability (−5° C.), elevated-temperature storage stability (54° C.) and the stability when diluted at 30° C.

Stability Test Results

Formulation Examples 1 to 10 were tested for low-temperature and elevated-temperature storage stability. Low-temperature storage stability was carried out in a low-temperature apparatus at −5° C. for 7 days. Elevated-temperature storage stability was conducted in an oven at 54° C. for 14 days. After finishing the test, the formulation example was filtered through a 342 mesh sieve, and the flowability of the formulation and the formation of crystals were observed.

In addition, the elevated storage phenomena was observed after the samples were taken out from 54° C. and kept at ambient for one to two days.

The performance of the formulation examples in relation to suspensibility and dispersibility were determined before and after low-temperature storage at −5° C. and elevated-temperature storage at 54° C. In a 250-mL cylinder with CIPAC D water, 1 g of sample was added. If the sample dropped to the bottom of the cylinder quickly, it means the sample has a bad dispersibility. If the sample can disperse in water simultaneously, it means the sample has a good dispersibility. Then the cap was covered and the cylinder was shaken up and down for 10 times and was allowed to stand for 1 min. If lots of settled solids were observed, the sample has a bad suspensibility. If traces of settled solids were observed, the sample has a good suspensibility.

The suspoemulsion formulations of the present invention had the following characteristics:

| Example | Low-temperature storage stability at −5° C. for 7 days | Elevated-temperature stability at 54° C. for 14 days | Disperibility and suspensibility before and after storage |
|---|---|---|---|
| Example 1 | Good flowability, no crystal formation | Good flowability, no crystal formation | Good |
| Example 2 | Good flowability, no crystal formation | Good flowability, no crystal formation | Good |
| Example 3 | Good flowability, no crystal formation | Good flowability, no crystal formation | Good |

-continued

| Example | Low-temperature storage stability at −5° C. for 7 days | Elevated-temperature stability at 54° C. for 14 days | Disperibility and suspensibility before and after storage |
|---|---|---|---|
| Example 4 | Good flowability, no crystal formation | Good flowability, no crystal formation | Good |
| Example 5 | Good flowability, no crystal formation | Good flowability, no crystal formation | Good |
| Example 6 | Good flowability, no crystal formation | Good flowability, no crystal formation | Good |
| Example 7 | Good flowability, no crystal formation | Good flowability, no crystal formation | Good |
| Example 8 | Good flowability, no crystal formation | Good flowability, no crystal formation | Good |
| Example 9 | Good flowability, no crystal formation | Good flowability, no crystal formation | Good |
| Example 10 | Good flowability, no crystal formation | Good flowability, no crystal formation | Good |

Phytoxicity Test Results

Trials to compare relative phytotoxicity were carried out with the formulation examples according to the present invention, commercial product imidacloprid 200 SL (CONFIDOR® from Bayer) and lambda-cyhalothrin120 EC (KA-RATE® from Syngenta). In terms of the severity of the symptoms, the test samples are categorized as follows:
Cat 0: no phytotoxicity
Cat 1: slight phytotoxicity
Cat 2: strong phytotoxicity The phytotoxicity test showed that the Formulation Examples 1 to 10 all exhibited a phytotoxicity of Cat 0 level. The commercial product imidacloprid 200 SL exhibited Cat 1 level phytotoxicity and lambda-cyhalothrin 120 EC exhibited Cat 2 level phytotoxicity. In summary, the suspoemulsion formulation of the present invention was significantly less phytotoxic than the commercial EC product.

From the experimental data set out above, it can be seen that the suspoemulsion formulation according to the present invention has good flowability and storage stability at both low and high temperatures. Further, the suspoemulsion has good dispersibility and suspensibility before and after low-temperature storage at −5° C. and elevated-temperature storage at 54° C. Still further, the phytotoxicity exhibited by the formulation examples of the invention is significantly less than the commercial EC formulation.

The invention claimed is:

1. An aqueous suspoemulsion, comprising:
a dispersed oil phase of Component (a), comprising: (i) lambda-cyhalothrin as the first active ingredient; (ii) at least one solvent having lambda-cyhalothrin dissolved therein to obtain a homogenous solution, wherein said active ingredient from the group (i) of Component (a) present in the homogenous solution is between 5% and 40% by weight, based on the total weight of the aqueous suspoemulsion, and wherein said at least one solvent in Component (a) is selected from the group consisting of N-methyl pyrrolidone, methyl oleate, propylene carbonate, N-octyl pyrrolidone, cyclohexyl-1-pyrrolidone, paraffinic hydrocarbons, isoparaffinic hydrocarbons, cycloparaffinic hydrocarbons, and combinations thereof;
a continuous water phase of Component (b) being distinct from the dispersed oil phase of Component (a), the continuous water phase of Component (b) comprising: (i) imidacloprid as the second active ingredient; and (ii) water having imidacloprid suspended therein.

2. The aqueous suspoemulsion according to claim 1, wherein said Component (b) further comprises: (iii) at least one dispersant.

3. The aqueous suspoemulsion according to claim 2, wherein the dispersant in (iii) of Component (b) is selected from the group consisting of methacrylic acid-methyl methacrylate-polyethylene glycol graft copolymers, tristyrylphenolethoxylates, sulfated or phosphated tristylphenolethoxylates and salts thereof, and propylene oxide-ethylene oxide block copolymers.

4. The aqueous suspoemulsion according to claim 3, wherein tristyrylphenolethoxylates have an average of 16 to 60, preferably 16 to 50 EO units.

5. The aqueous suspoemulsion according to claim 3, wherein sulfated or phosphated tristylphenolethoxylates have an average of 6 to 20.

6. The aqueous suspoemulsion according to claim 3, wherein propylene oxide-ethylene oxide block copolymers have 10% to 50% EO.

7. The aqueous suspoemulsion according to claim 6, wherein propylene oxide-ethylene oxide block copolymers further have a central polyoxypropylene portion with a molecular mass ranging from 1500 to 2000.

8. The aqueous suspoemulsion according to claim 1, wherein said active ingredient from the group (i) of Component (b) is between 5% and 60% by weight.

9. The aqueous suspoemulsion according to claim 1, wherein said solvents from the group (ii) of Component (a) are between 1% and 40% by weight.

10. The aqueous suspoemulsion according to claim 1, wherein said water content from the group (ii) of Component (b) is between 25% and 80% by weight.

11. The aqueous suspoemulsion according to claim 1, wherein said dispersants added to Component (b) are between 1% and 10% by weight.

12. The aqueous suspoemulsion according to claim 1, wherein the weight ratio of lambda-cyhalothrin and imidacloprid is in the range of from 60:1 to 1:60.

13. A process for preparing an aqueous suspoemulsion defined in claim 1, comprising: Step 1: Preparing a lambda-cyhalothrin emulsifiable concentrate phase by mixing the lambda-cyhalothrin with a suitable solvent as defined in claim 1; Step 2: Preparing a dispersion of imidacloprid in a continuous water phase by mixing the imidacloprid, a dispersant and a required amount of water; and Step 3: Combining the emulsifiable concentrate phase in Step 1 with the water phase in Step 2.

14. A process for preparing an aqueous suspoemulsion defined in claim 1, comprising: Step 1: Preparing a lambda-cyhalothrin emulsifiable concentrate phase by mixing the lambda-cyhalothrin with a suitable solvent as defined in claim 1; Step 2: Adding the lambda-cyhalothrin emulsifiable concentrate phase in Step 1 into water with high shear to give a lambda-cyhalothrin oil-in-water emulsion phase; Step 3: Preparing a dispersion of imidacloprid in a continuous water phase by mixing the imidacloprid, a dispersant and a required amount of water; and Step 4: Combining the oil-in-water emulsion phase in Step 2 with the water phase in Step 3.

15. A process for preparing an aqueous suspoemulsion defined in claim 1, comprising the steps: Step 1: Preparing a lambda-cyhalothrin emulsifiable concentrate phase by mixing the lambda-cyhalothrin with a solvent as defined in claim 1, along with suitable emulsifiers; Step 2: Preparing a dispersion of imidacloprid active ingredient in a continuous water phase by mixing the active ingredient, a dispersant and a required amount of water; Step 3: Adding the emulsifiable concentrate phase produced in Step 1 to the water phase in Step 2 under continuous agitation for an optimum amount of time; Step 4: Preparing thickeners in advance to enable them to be hydrated and ready for addition in Step 5 as mentioned below; and Step 5: Adding a suitable quantity of thickener from Step 4 to the mixture in Step 3 and continuously agitating till the mixture becomes a homogeneous suspension.

16. A process for preparing the suspoemulsion defined in claim 1, comprising: Step 1: Preparing a lambda-cyhalothrin emulsifiable concentrate phase by mixing the lambda-cyhalothrin with a solvent as defined in claim 1 along with suitable emulsifiers; Step 2: Adding the lambda-cyhalothrin emulsifiable concentrate phase in Step 1 into water with high shear to give a lambda-cyhalothrin oil-in-water emulsion phase; Step 3: Preparing a dispersion imidacloprid in a continuous water phase by mixing the imidacloprid, a dispersant and a required amount of water; Step 4: Adding the oil-in-water emulsion in Step 2 into the water phase in Step 3 under continuous agitation for an optimum amount of time; Step 5: Preparing thickeners in advance to enable them to be hydrated and ready for addition in Step 6 as mentioned below; and Step 6: Adding suitable quantity of the thickener in Step 5 to the mixture in Step 4 and continuously agitating until the mixture becomes a homogeneous suspension.

17. The process, according to claim 15, wherein the components of Step 2 are mixed by being finely milled using a horizontal agitating bead mill with the process parameters maintained at median particle size D50 not to exceed 5 microns and D90 not to exceed 6 microns.

18. The aqueous suspoemulsion according to claim 1, further including at least one additive selected from the group consisting of an anti-foaming agent, an emulsifier, an antifreeze agent, a dispersant, a preservative, an antioxidant, a colorant, a thickener and an inert filler.

19. The aqueous suspoemulsion according to claim 3, wherein sulfated or phosphated tristylphenolethoxylates have an average of 7 to 16 EO units.

20. The aqueous suspoemulsion according to claim 3, wherein propylene oxide-ethylene oxide block copolymers have 30% to 40% EO.

21. The aqueous suspoemulsion according to claim 1, wherein said active ingredient from the group (i) of Component (a) is between 5% and 20% by weight.

22. The aqueous suspoemulsion according to claim 1, wherein said active ingredient from the group (i) of Component (b) is between 10% and 40% by weight.

23. The aqueous suspoemulsion according to claim 1, wherein said solvents from the group (ii) of Component (a) are between 5% and 20% by weight.

24. The aqueous suspoemulsion according to claim 1, wherein said dispersants added to Component (b) are between 1% and 5% by weight.

25. The process, according to claim 16, wherein the components of Step 3 are mixed by being finely milled using a horizontal agitating bead mill with the process parameters maintained at median particle size D50 not to exceed 5 microns and D90 not to exceed 6 microns.

26. The aqueous suspoemulsion according to claim 12, wherein the weight ratio of lambda-cyhalothrin and imidacloprid is in the range of from 40:1 to 1:40.

27. The aqueous suspoemulsion according to claim 26, wherein the weight ratio of lambda-cyhalothrin and imidacloprid is in the range of from 15:1 to 1:15.

28. The aqueous suspoemulsion according to claim 27, wherein the weight ratio of lambda-cyhalothrin and imidacloprid is in the range of from 10:1 to 1:10.

29. The aqueous suspoemulsion according to claim 28, wherein the weight ratio of lambda-cyhalothrin and imidacloprid is in the range of from 5:1 to 1:5.

30. The aqueous suspoemulsion according to claim 29, wherein the weight ratio of lambda-cyhalothrin and imidacloprid is in the range of from 2:1 to 1:2.

* * * * *